(12) United States Patent
Tian

(10) Patent No.: US 10,472,058 B2
(45) Date of Patent: Nov. 12, 2019

(54) VTOL AIRCRAFT WITH STEP-UP OVERLAPPING PROPELLERS

(71) Applicant: Fengfei Intelligent Technology Co., Ltd., Shanghai (CN)

(72) Inventor: Yu Tian, Hong Kong (HK)

(73) Assignee: SHANGHAI AUTOFLIGHT CO., LTD., Shanghai (CN)

(*) Notice: Subject to any disclaimer, the term of this patent is extended or adjusted under 35 U.S.C. 154(b) by 0 days.

(21) Appl. No.: 16/354,768

(22) Filed: Mar. 15, 2019

(65) Prior Publication Data

US 2019/0233098 A1 Aug. 1, 2019

Related U.S. Application Data

(63) Continuation-in-part of application No. 16/281,020, filed on Feb. 20, 2019, which is a continuation-in-part of application No. 15/950,123, filed on Apr. 10, 2018.

(60) Provisional application No. 62/623,413, filed on Jan. 29, 2018.

(51) Int. Cl.
| | |
|---|---|
| B64C 29/00 | (2006.01) |
| B64C 11/46 | (2006.01) |
| B64C 5/02 | (2006.01) |
| B64C 3/10 | (2006.01) |

(52) U.S. Cl.
CPC .......... B64C 29/0025 (2013.01); B64C 11/46 (2013.01); B64C 3/10 (2013.01); B64C 5/02 (2013.01)

(58) Field of Classification Search
CPC . B64C 27/08; B64C 29/0008; B64C 27/0016; B64C 27/0025; B64C 39/068; B64C 39/08; B64C 39/12; B64C 2201/108
See application file for complete search history.

(56) References Cited

U.S. PATENT DOCUMENTS

| | | | | |
|---|---|---|---|---|
| 3,053,480 A | * | 9/1962 | Vanderlip | ............... B64C 27/54 244/17.13 |
| 2006/0151666 A1 | * | 7/2006 | VanderMey | ........ B64C 29/0016 244/12.3 |

* cited by examiner

*Primary Examiner* — Nicholas McFall
(74) *Attorney, Agent, or Firm* — WPAT, P.C., Intellectual Property Attorneys; Anthony King

(57) ABSTRACT

A vertical takeoff and landing (VTOL) fixed-wing aircraft having overlapping propellers and low handing vertical stabilizers disposed on the rear end of the aircraft.

20 Claims, 20 Drawing Sheets

ND OVERLAPPING PROPELLERS

VTOL AIRCRAFT WITH STEP-UP OVERLAPPING PROPELLERS

CROSS-REFERENCE TO RELATED APPLICATIONS

This application claims priority to and is a continuation-in-part application of U.S. patent application Ser. No. 16/281,020, filed on Feb. 20, 2019, now pending, which is a continuation-in-part application of U.S. patent application Ser. No. 15/950,123, filed on Apr. 10, 2018, which claims priority to U.S. provisional patent application No. 62/623,413, filed on Jan. 29, 2018, all of which are hereby incorporated by reference in their entireties.

FIELD OF THE DISCLOSURE

The present disclosure relates to a vertical takeoff and landing (VTOL) aircraft, and more particularly, a tail configuration of a VTOL fixed-wing aircraft.

BACKGROUND OF THE DISCLOSURE

Aerial drones, whether manned or unmanned, large or small, have been proposed to conduct various missions and functions. Their missions and functions, however, are often limited by the traveling range and endurance of the drone. There is a continuing need for a drone that is sufficiently efficient to travel longer distances.

Also, some aerial drones are known to carry people, and some aerial drones are known to carry cargo. Each of these two types of drones has its unique challenges to perform effectively and efficiently.

There is a continuing need for new ways to carry people and/or cargo effectively and efficiently.

All referenced patents, applications and literatures are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply. The disclosed embodiments may seek to satisfy one or more of the above-mentioned desires. Although the present embodiments may obviate one or more of the above-mentioned desires, it should be understood that some aspects of the embodiments might not necessarily obviate them.

BRIEF SUMMARY OF THE DISCLOSURE

In a general implementation, a VTOL (vertical take-off and landing) aircraft includes a body, a left main wing and a right main wing coupled to the body, a left secondary wing and a right secondary wing coupled to the body, a left linear support connecting the left main wing to the left secondary wing, a right linear support connecting the right main wing to the right secondary wing, wherein the left linear support is parallel to the right linear support.

In one aspect combinable with the general implementation, there can be at least two lifting propellers disposed on a top surface of each of the left and right linear supports, wherein the at least two lifting propellers on each of the left and right linear supports are all horizontally positioned on a first horizontal plane.

In another aspect combinable with the general implementation, there can be a left tail-top propeller disposed at a rear end of the VTOL aircraft, horizontally positioned higher than the first horizontal plane.

In another aspect combinable with the general implementation, there can be a right tail-top propeller disposed at the rear end of the VTOL aircraft, horizontally positioned higher than the first horizontal plane.

In yet another aspect combinable with the general implementation, a radius of the left and right tail-top propellers can be the same as a radius of each of the at least two lifting propellers.

In still another aspect combinable with the general implementation, from a direct top view, a range of rotary motion of the left tail-top propeller partially and visually overlaps with a range of rotary motion of a rearmost propeller out of the at least two lifting propellers disposed on the left linear support.

In another aspect combinable with the general implementation, the left and right secondary wings can be forewings disposed in front of the left and right main wings, thereby adapting a canard body style.

In another aspect combinable with the general implementation, there can be a pod detachably attached to the body, wherein the pod can be a passenger pod or a cargo pod.

In another aspect combinable with the general implementation, there can be motorized wheels disposed on the pod allowing the pod to move across a surface.

In another aspect combinable with the general implementation, each of the left and right linear support can extend rearward beyond the left and right main wings, wherein the left and right main wings can be a pair of rearmost wings.

In another aspect combinable with the general implementation, there can be a left vertical stabilizer disposed on a rear end of the left linear support, wherein the left tail-top propeller can be disposed on a top end of the left vertical stabilizer.

In still another aspect combinable with the general implementation, the left vertical stabilizer can have a bottom portion that extends downwardly beyond the first horizontal plane.

In one other aspect combinable with the general implementation, there can be a landing gear disposed on a bottom end of the bottom portion. The landing gear can be any known type of landing gear, e.g., skids and wheels.

In yet another aspect combinable with the general implementation, the left vertical stabilizer can have a front leading edge that spans in a forward direction beyond an axis of the rearmost propeller out of the at least two lifting propellers disposed on the left linear support.

Among the many possible implementations of the VTOL aircraft, another general implementation of the VTOL aircraft can have a body, a left main wing and a right main wing coupled to the body, a left secondary wing and a right secondary wing coupled to the body, a left linear support connecting the left main wing to the left secondary wing, a right linear support connecting the right main wing to the right secondary wing, wherein the left linear support is parallel to the right linear support.

In one particular embodiment, there can be at least two lifting propellers disposed on each of the left and right linear supports. In another embodiment, these propellers are only disposed on the top side of the linear supports, and none are disposed on the underside of the linear supports. In yet other embodiments, some propellers are disposed on the top side while other propellers are disposed on the underside of the linear supports.

In yet another embodiment, there can be a left vertical stabilizer disposed on a rear end of the left linear support, wherein the left vertical stabilizer has a bottom portion that extends downwardly and is lower than a lowest point of the body.

In some embodiments, there can be a landing gear disposed on a bottom end of the bottom portion.

Further, it is contemplated that the VTOL aircraft can have a left tail-top propeller coupled to the left linear support and it can be positioned vertically higher than the at least two lifting propellers.

Also, it is contemplated that a radius of the left tail-top propeller is the same as a radius of each of the at least two lifting propellers on the left linear support. In some embodiments, all of the propellers of the VTOL aircraft that has a horizontal plane of motion are of the same radius.

It is also contemplated that the rearmost lifting propeller of the at least two lifting propellers on the left linear support can have a first rotary range of motion and the left tail-top propeller can have a second rotary range of motion, the first rotary range of motion being offset vertically from the second rotary range of motion, and from a top view the first rotary range of motion partially overlaps with the second rotary range of motion. This visually overlapping arrangement creates a step-up configuration where the two propellers are disposed at different heights relative to the body of the VTOL aircraft.

Some embodiments contemplate a detachable pod coupled to the body, wherein the pod can be a passenger pod or a cargo pod. The pod may also carry other functions besides carrying passengers or cargo. For example, it may contain recording devices, sensory devices, or other electronics.

Some embodiments of the pods can include motorized wheels coupled to the pod allowing the pod to move across a surface whether or not is it attached to the body of the VTOL aircraft. The pod may move under the direction of an on-board driver/pilot, or under the direction of someone remotely. The pod may also move autonomously.

It is contemplated that there can be a push propeller coupled to the pod, to the body of the aircraft, or both.

Contemplated rear end of the VTOL aircraft can have a vertical stabilizer having a top portion that extends upwardly beyond a horizontal position of the linear support. A tail-top propeller can be disposed on the top end of the top portion.

The VTOL aircraft is contemplated to have certain embodiments having a retractable or foldable front landing gear disposed on a bottom front end of the body. In certain embodiments, this retractable landing gear can have an elongated body with a skid.

The VTOL aircraft is contemplated to have certain embodiments having a rear landing gear that can retrieve into the bottom portion of each vertical stabilizer. In certain embodiments, this rear landing gear can be a skid or a wheel.

While this specification contains many specific implementation details, these should not be construed as limitations on the scope of any inventions or of what may be claimed, but rather as descriptions of features specific to particular implementations of particular embodiments. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above and below as acting in certain combinations and even initially claimed as such, one or more features from a claimed combination can in some cases be excised from the combination, and the claimed combination may be directed to a subcombination or variation of a subcombination.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

It should be noted that the drawing figures may be in simplified form and might not be to precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

Figure 1:
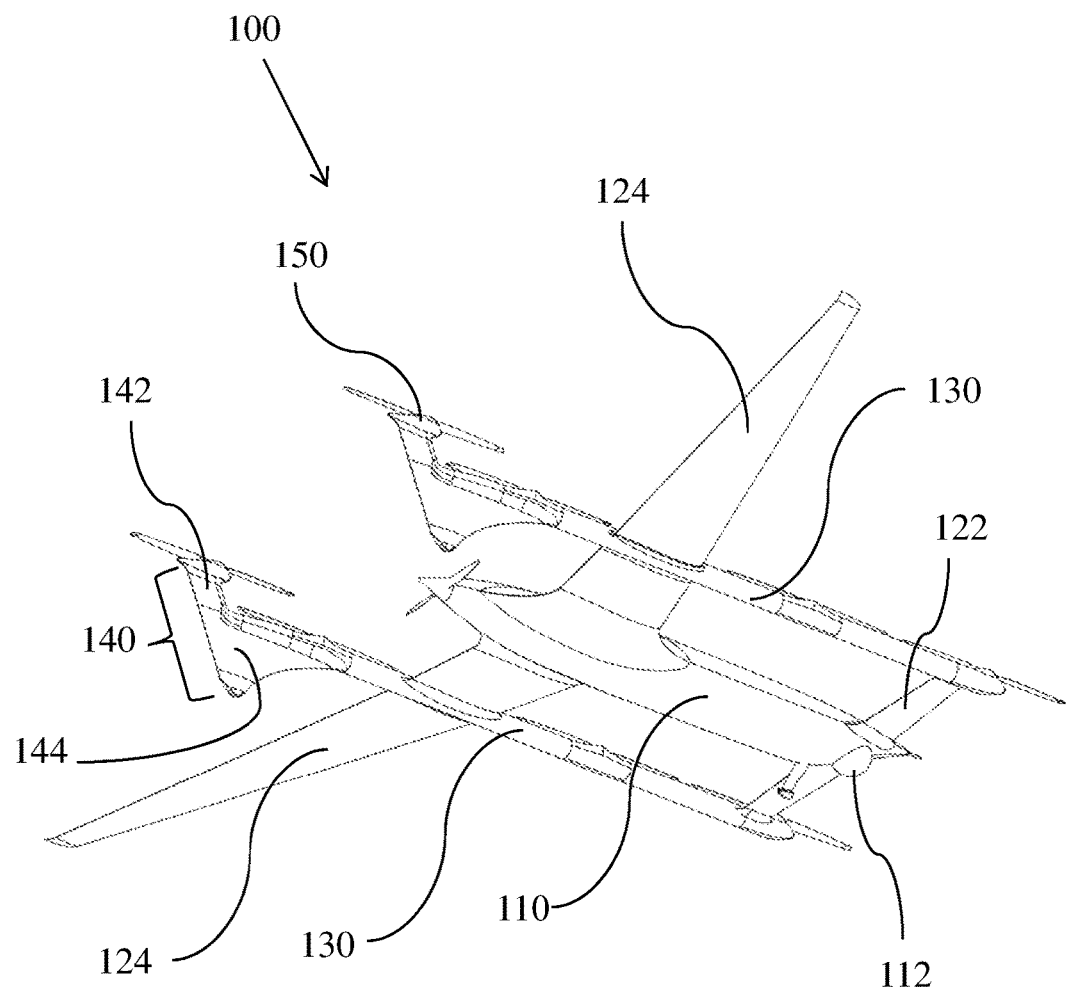
FIG. 1 is a bottom side perspective view of one embodiment of a VTOL fixed-wing aircraft having step-up overlapping propellers at its rear end.

The following call out a list of elements in the drawing can be a useful guide when referencing the elements of the drawing figures:

- 100 VTOL aircraft
- 110 Body
- 112 Camera
- 122 Secondary wing
- 124 Main wing
- 130 Linear support
- 131 First lifting propeller
- 132 Second lifting propeller
- 133 Third lifting propeller
- 134 Fourth lifting propeller/Tail-top propeller
- 135 Fifth lifting propeller
- 136 Sixth lifting propeller
- 137 Seventh lifting propeller
- 138 Eighth lifting propeller/tail-top propeller
- 139 Push propeller
- 140 Tail vertical stabilizer
- 142 Top portion
- 144 Bottom portion
- 145 Tail end of the linear support
- 146 Front leading edge
- 147 Front terminal end
- 148 Vertical offset
- 149 Horizontal offset
- 150 Motor housing
- 162 Front landing gear
- 164 Rear landing gear
- 200 VTOL aircraft
- 210 Body
- 222 Secondary wing
- 224 Main wing
- 230 Linear support
- 233 Third lifting propeller
- 234 Fourth lifting propeller/tail top propeller
- 238 Eighth lifting propeller/tail top propeller
- 239 Push propeller
- 240 Tail vertical stabilizer
- 242 Top portion
- 244 Bottom portion
- 245 Tail end of the linear support
- 246 Front leading edge
- 247 Front terminal end
- 260 Passenger Pod
- 262 Front landing gear
- 264 Rear landing gear
- 265 Wheel
- 268 Motor housing of wheel
- 300 VTOL aircraft
- 310 Body
- 322 Secondary wing
- 324 Main wing
- 330 Linear support
- 339 Push propeller
- 340 Tail vertical stabilizer
- 342 Top portion
- 344 Bottom portion
- 345 Tail end of the linear support
- 346 Front leading edge
- 347 Front terminal end
- 360 Cargo pod
- 362 Front landing gear
- A1 Axis 1
- A2 Axis 2
- R1 Radius 1
- R2 Radius 2

DETAILED DESCRIPTION OF THE EMBODIMENTS

The different aspects of the various embodiments can now be better understood by turning to the following detailed description of the embodiments which are presented as illustrated examples of the embodiments defined in the claims. It is expressly understood that the embodiments as defined by the claims may be broader than the illustrated embodiments described below.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The term "drone" is defined as a flying transportation system of any size having at least one lifting propeller as a source of propulsion. The term "drone" can include "manned" and "unmanned" flying transportation systems. A manned drone can mean a flying transportation system that carries one or more human passengers all of who has no control over the drone. A manned drone can also mean a flying transportation system that carries one or more human passengers some or one of who has some or all control over the drone. An unmanned drone can mean a flying transportation system that does not carry any human passenger and it either flies autonomously or it is remotely controlled by someone at a distance from the drone.

The term "VTOL aircraft" is defined as a flying transportation system of any size which has at least one propeller as a source of propulsion. The term "VTOL aircraft" can include "manned" and "unmanned" flying transportation system. A manned VTOL aircraft can mean a flying transportation system that carries one or more human passengers all of who has no control over the VTOL aircraft. A manned VTOL aircraft can also mean a flying transportation system that carries one or more human passengers some or one of who has some or all control over the VTOL aircraft. An unmanned VTOL aircraft can mean a flying transportation system that does not carry any human passenger and it either flies autonomously or it is remotely controlled by someone at a distance from the VTOL aircraft.

The term "fixed-wing" is defined as a non-rotating wing on an aircraft this is capable of generating lift caused by the aircraft's forward airspeed and the shape of the fixed-wings.

FIG. 1 generally depicts an embodiment of a VTOL fixed-wing aircraft 100 having a canard configuration. It should be especially noted that although all figures depict a canard style aircraft, other airplane types are also specifically contemplated to implement many of the inventive features described herein. For example, the main wings can be located in front of the secondary wings.

The VTOL fixed-wing aircraft 100 can have two main wings 124, and two secondary wings 122. Here in FIG. 1, the secondary wings 122 are canard wings. The two main wings 124 and the two secondary wings 122 can be attached to a body 110, wherein the body 110 can be located alone a center longitudinal line of the VTOL aircraft 100.

In the embodiments shown in FIGS. 1-9, the secondary wings 122 each of which has a length no longer than half the length of each of the main wings 124. Similarly, in the embodiments shown in FIGS. 10-22, the secondary wings 222, 322 each of which has a length no longer than half the length of each of the main wings 224, 324, respectively. Secondary wings 122 of longer lengths are also specifically contemplated. For example, secondary wings 122 can have a length equal to or longer than the length of main wings 124.

There can also be a left linear support 130 disposed parallel to the body 110, and the left linear support 130 can connect the left main wing 124 to the left secondary wing 122. Similarly, there can also be a right linear support 130 disposed parallel to the body 110, and the right linear support 130 can connect the right main wing 124 to the right secondary wing 122.

The left and right linear supports 130 can improve the structural integrity of the aircraft 100. In other embodiments, the left and right linear supports 130 can house driving motors (not shown) each of which drives each of the lifting propellers 131, 132, 133, 135, 136, 137.

In one embodiment, the left and right linear supports 130 are each attached to the distal ends of respective left and right secondary wings 122. In yet another embodiment, the left and right linear supports 130 each extends forward beyond the secondary wings 122 (shown in FIG. 4).

In one embodiment, the left and right linear supports 130 are attached to near the mid-section of left and right main wings 124, respectively. In yet another embodiment, the left and right linear supports 130 extend in a rearward direction beyond the main wings 124 (shown in FIG. 4).

The left linear support 130 is contemplated to be relatively narrow in diameter and may have a plurality of lifting propellers 131, 132, 133 disposed on either the top side, bottom side, or both, of the left linear support 130.

In the particular embodiment depicted in FIG. 1, lifting propellers 131, 132, 133 are disposed on only the top side of the left linear support 130. In some embodiments, there is to be no lifting propellers disposed on the underside of the linear support 130.

As mentioned above, these lifting propellers 131, 132, 133, 135, 136, 137 can each be individually driven by a designated low profile motor disposed within a hollow interior of the left linear support 130. Likewise, the right linear support 130 is contemplated to be similar in construction and configuration.

Figure 3:
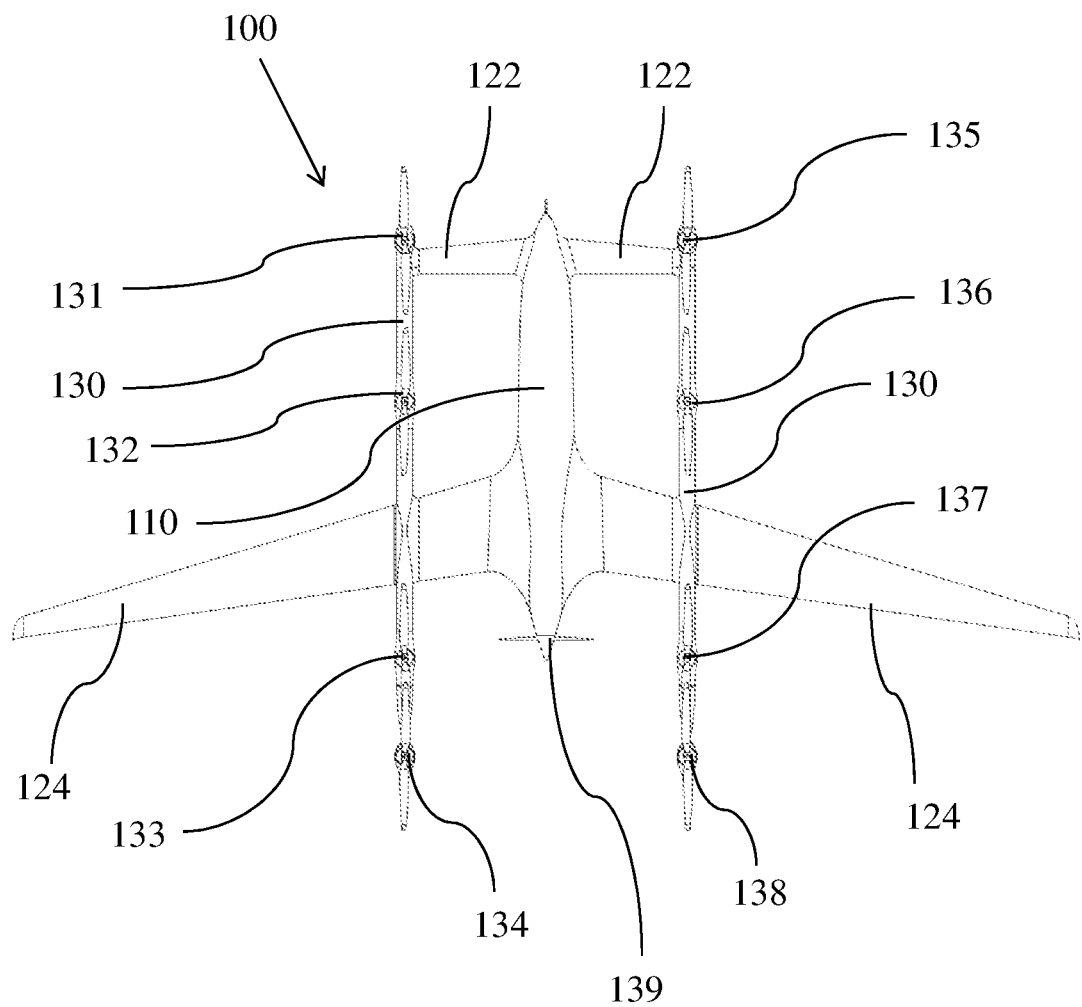
FIG. 3 is a top view of an embodiment of a VTOL fixed-wing aircraft having step-up overlapping propellers at its rear end.
Figure 4:
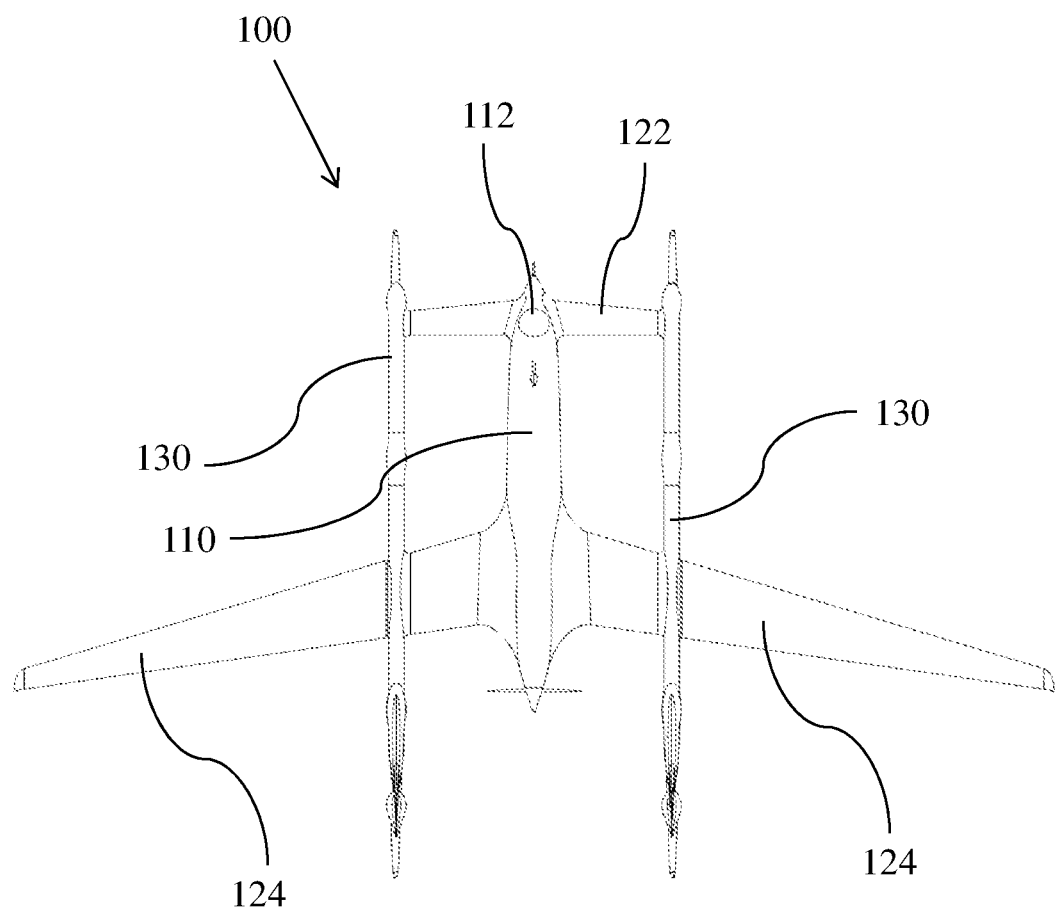
FIG. 4 is a bottom view of an embodiment of a VTOL fixed-wing aircraft having step-up overlapping propellers at its rear end.

During high speed flying, all six lifting propellers 131, 132, 133, 135, 136, 137 can be locked into position so each blade is in a fixed position parallel to the linear support 130 (as shown in FIG. 3).

Depending on the intended utility of the VTOL fixed-wing aircraft 100, the body 110 can have communication equipment or sensory equipment such as a camera 112.

Figure 2:
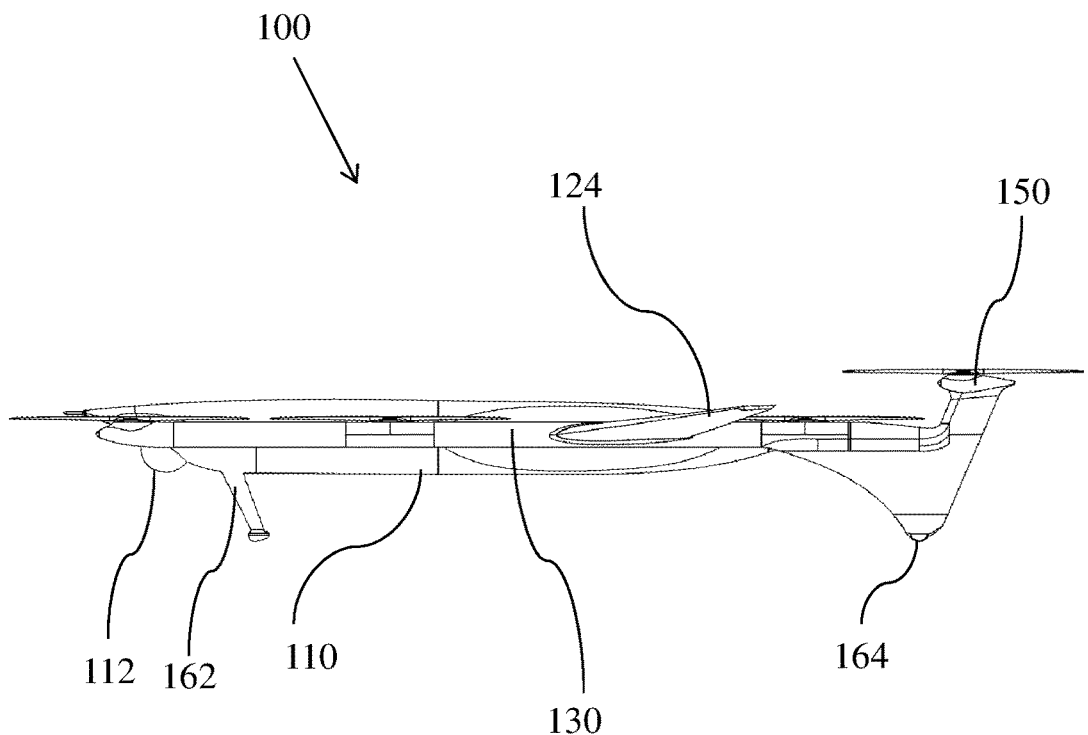
FIG. 2 is a side view of an embodiment of a VTOL fixed-wing aircraft having step-up overlapping propellers at its rear end.

Referring now to FIG. 2, the VTOL aircraft 100 may have at least one pushing propeller 139 to provide thrust during flight in a forward direction. In the embodiment as shown in FIG. 2, pushing propeller 139 is provided at the rear end of the body 110. The pushing propeller may also be disposed elsewhere (not shown) on the aircraft 100, 200, 300 or be part of a detachable pod 260, 360 (not shown). When such pod 260, 360 (having its own pushing propeller) is attached to the body 210 of FIG. 10, the pushing propeller 262 can provide thrust during flight.

Referring now to FIG. 2, the VTOL fixed-wing aircraft 100 is contemplated to use any type of front landing gear 162 and rear landing gear 164. In one embodiment, the VTOL aircraft 100 can have at least one leg stand as a front landing gear 162. Alternative or optionally, the front landing gear can have a skid or a wheel. The skid can be a single-blade leaf spring. The front landing gear 162 can be disposed on and extends from the front underside of the body 110. In one embodiment, the front landing gear 162 can be foldable or retractable partially or entirely into the body 110 during flight. As for the rear landing gear 164, the embodiments of FIGS. 1, 2, and 5 each has a wheel on the bottom portion 144 of each tail vertical stabilizer 140. This wheel can be retractable or it can be non-retractable.

Other types of landing gears are also contemplated for any disclosed embodiments, such as those shown in FIGS. 10-22. Referring now to FIGS. 10-22, the VTOL aircraft 200, 300, can each use at least one front leg (262 and 362). The front leg 262, 362 can each optionally have skids or wheels. These skids can each be a single-blade leaf spring. The front leg 262, 362 can be disposed on the front underside of the body 210, 310. The front leg 262, 362 can also be foldable or retractable (partially or entirely) into the body 210, 310 during flight. As for the rear landing gear 264 in the embodiments shown in FIGS. 10-15, two legs are provided each of which can or cannot retract or retrieve (partially or entirely) into the interior space of the left and right vertical stabilizers 244 during flight. As for the rear landing gear 364 in the embodiments shown in FIGS. 16-22, the bottom tip of their vertical stabilizers 340 can be used as the rear landing gear 364. Optionally, wheels can be provided as shown.

The contemplated single-blade leaf springs mentioned herein can be made of any suitable material to provide sufficient resiliency and integrity. Such material can include natural and synthetic polymers, various metals and metal alloys, naturally occurring materials, textile fibers, and all reasonable combinations thereof. In one embodiment, carbon fiber is used.

At the rear ends of each linear support 130, 230, 330 can be provided a vertical stabilizer 140, 240, 340, respectively. As will be described below, these vertical stabilizers 140, 240, 340 are contemplated to have various sizes, shapes, and configurations.

Figure 5:
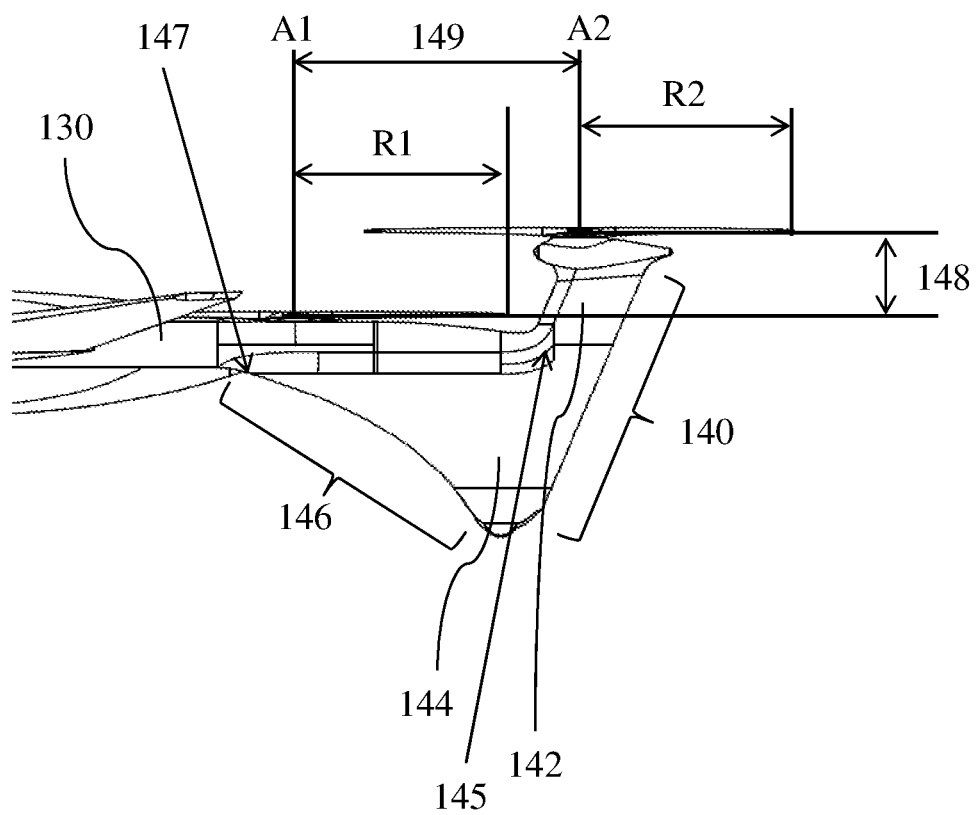
FIG. 5 is a close-up side view of one embodiment of the rear end of the contemplated VTOL fixed-wing aircraft.

FIG. 5 generally depicts the basic structure of one embodiment of the vertical stabilizer 140 in accordance with the one of the disclosed embodiments. The vertical stabilizer 140 can have a top portion 142 that is located vertically above the horizontal position of the linear support 130 (as defined by the longitudinal axis of the linear support 130). In other words, the top portion 142 can be a part of the tail vertical stabilizer 140 that is positioned higher than the longitudinal axis of the linear support 130. A fourth lifting propeller/tail-top propeller 134 (see FIG. 3) can be disposed at the topmost part of the top portion 142. This tail-top propeller 134 can be driven by a motor disposed in the motor housing 150 (see FIG. 2) which is located at the upper tip of the top portion 142.

The tail-top propeller 134 (see FIG. 3) is contemplated to be vertically offset from the vertical position of the third lifting propeller 133 (see FIG. 3). Referring now to FIG. 5, in one embodiment, this vertical offset 148 has a distance not longer than the radius R2 of the tail-top propeller. In another embodiment, this vertical offset 148 has a distance longer than (not shown) the radius R2 of the tail-top propeller. In still another embodiment, this vertical offset 148 has a distance substantially equal (not shown) to the radius R2 of the tail-top propeller.

The third lifting propeller 133, or the rearmost lifting propeller disposed on the linear support 130, is contemplated to be disposed on the linear support 130 such that its blades are substantially close to the top surface of the linear support 130. In other words, the plane of rotation of its blades can be substantially close to the top surface of the linear support 130. In FIG. 5, the blades of the third lifting propeller 133 rotate about axis A1 which is horizontally offset from axis A2 of the tail-top propeller 134. In one embodiment, this horizontal offset 149 has a distance longer than the radius R2 of the tail-top propeller 134. In yet another embodiment, the radius R2 of the tail-top propeller 134 is no more than about 75% of the horizontal offset 149. In still another embodiment, the radius R2 of the fourth lifting propeller 134 is no more than about 60% of the horizontal offset 149. In a further embodiment, the radius R2 of the fourth lifting propeller 134 is no more than about 50% of the horizontal offset 149. In a still further embodiment, the radius R2 of the fourth lifting propeller 134 is substantially the same as the horizontal offset 149.

The horizontal offset 149 and the vertical offset 148 create a step-up propeller configuration in the tail end of the VTOL aircraft 100 where two consecutive lifting propellers 133, 134 are staggered. Furthermore, the two staggered lifting propellers 133, 134 have their areas of blade rotation partially overlapped when looking from the top down (see FIG. 6). In other words, the columns of downdraft air created by each of the two staggered lifting propellers 133, 134 partially overlap each other.

One of ordinary skill in the art would typically dismiss a design of having overlapping columns of downdraft air due to perceived problems that can result from such configuration. These problems can include instability, turbulence, and inefficiencies. The inventor has discovered that such overlap can improve energy efficiency and flight stability. In one particularly contemplated embodiment, there can be two rows of lifting propellers, no more than four lifting propellers in each row. In another embodiment, there can be no less than four lifting propellers in each row.

The exemplary embodiment of FIG. 5 provides a bottom portion 144 that extends lower than the longitudinal axis of the linear support 130. The lowest point of the bottom portion 144 can be as low as the lowest point of a front landing gear 162. In this way, the bottom portion 144 can function as a landing gear 164. Alternatively or optionally, the bottom portion 144 can have a wheel (as shown in FIGS. 1, 2, 5, and 7).

The bottom portions 244 as shown in FIGS. 10-15 provide other exemplary embodiments where the lowest point of the bottom portion 244 is not as low as the lowest end of the front landing gears 262. In these embodiments, the rear landing gear 264 has a length that extends from the bottom portion 244. In this way, the length of the rear landing gear 264 has a lowest point horizontally level with the lowest point of the front landing gears 262.

Returning now to FIG. 5, the top portion 142 and the bottom portion 144 in this particular embodiment have a smooth transition because the tail end 145 of the linear support 130 terminates at a point in front of the transition. Or in another way, the tail end 145 of the linear support 130 only covers a frontal portion of the transition. This essentially creates a single large tail vertical stabilizer 140, which can have substantially the same thickness lengthwise in a vertical direction. Compare this to the exemplar vertical stabilizers of FIGS. 10-22 where the tail ends 245, 345 of the respective linear supports 230, 330 terminate in the middle of the transition, or encompass the transition. In this way, the tail ends 245, 345 visually divide the top portion 242, 342 from the bottom portion 244, 344 due to the visible bulging surface of the tail ends 245, 345 of the linear supports 230, 330. In another embodiment, the tail ends 245, 345 is positioned rearwardly beyond axis A2 of the tail top propeller 234, 238, 334, 338, respectively.

The bottom portion 144 has a front leading edge 146. Contemplated front leading edge 146 can be of various angles relative to the longitudinal axis of the linear support 130. In the exemplary embodiment of FIG. 5, the leading edge 146 has an angle of between 20 degrees to 45 degrees relative to the longitudinal axis of the linear support 130. In other embodiments, the leading edge can be angled more than 45 degrees relative to the longitudinal axis of the linear support 130. In yet other embodiments, the leading edge can be less than 20 degrees relative to the longitudinal axis of the linear support 130. Similarly for FIGS. 10-22, the leading edges 246, 246 can be of various angle degrees relative to the longitudinal axis of the linear support 130.

The exemplary leading edge 146 in FIG. 5 has a front terminal end 147 positioned forward of axis A1 of the third lifting propeller 133. This configuration provides a much larger surface area to the bottom portion 144 versus the surface are of top portion 142. Similarly, the exemplary leading edges 246, 346 in FIGS. 10-22 each has a front terminal end 247, 347 positioned in alignment with axis A1 of the third lifting propeller 233, 333. This configuration provides a similarly larger surface area to the bottom portion 244, 344 versus the surface are of top portion 242, 342. In one embodiment, the ratio of top portion's 142, 242, 342 surface area to its respective bottom portion's 144, 244, 344 surface area is 1:at least 2. In another embodiment, the ratio is 1:at least 3. In a further embodiment, the ratio is 1:1-2. In still other embodiments, the ratio is 1:at most 1.

Figure 6:
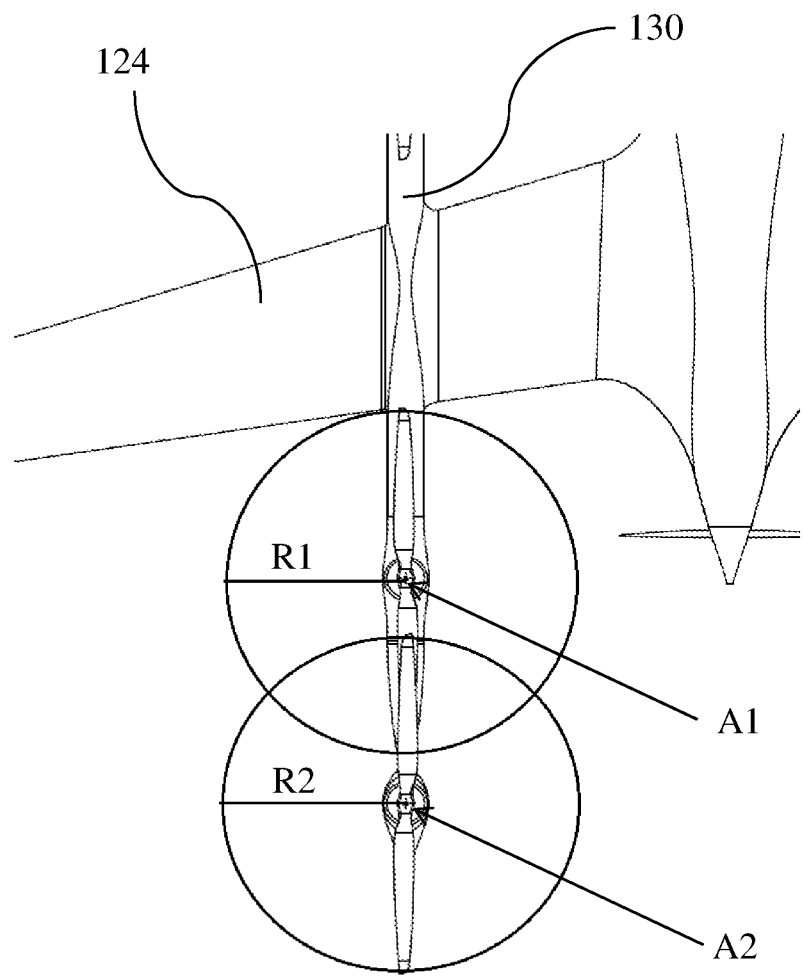
FIG. 6 is a close-up top view of one embodiment of the rear end of the contemplated VTOL fixed-wing aircraft showing overlapping step-up propellers.
Figure 7:
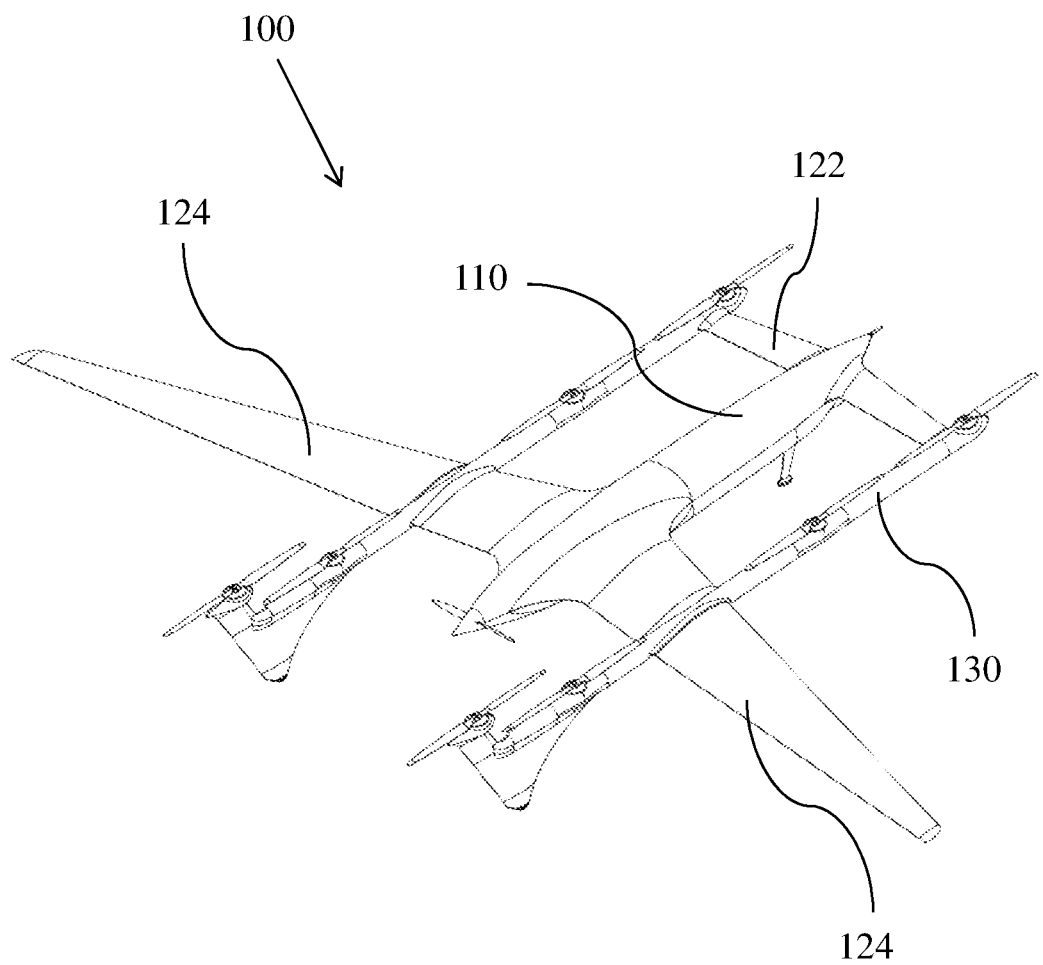
FIG. 7 is a top perspective view of an embodiment of a VTOL fixed-wing aircraft having step-up overlapping propellers at its rear end.
Figure 8:
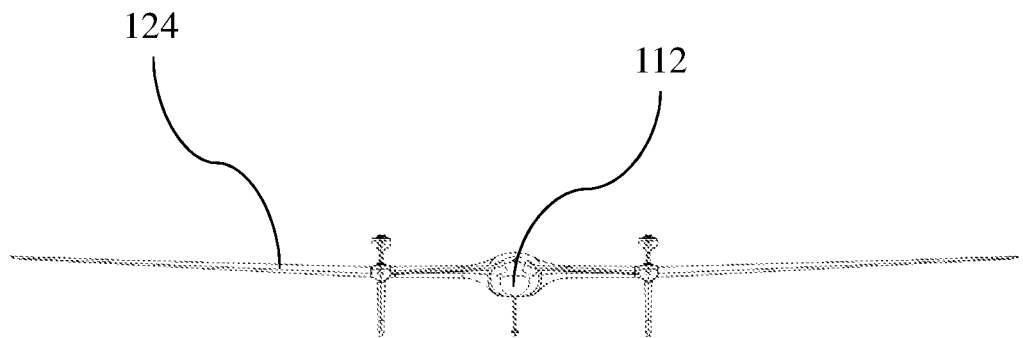
FIG. 8 is a front view of an embodiment of a VTOL fixed-wing aircraft having step-up overlapping propellers at its rear end.
Figure 9:
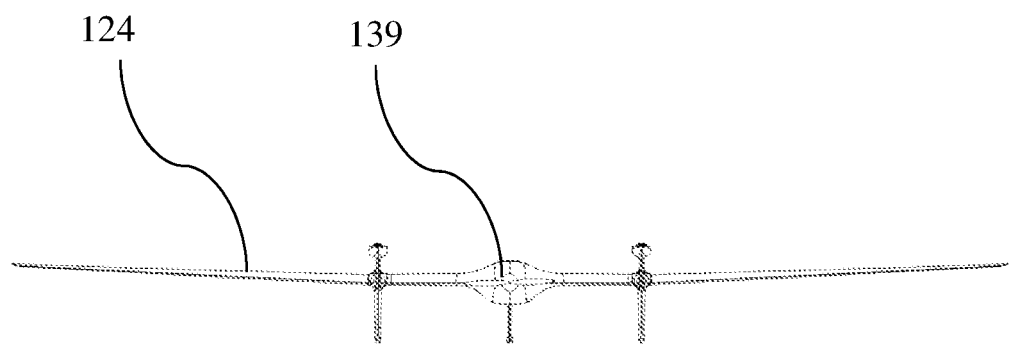
FIG. 9 is a rear view of an embodiment of a VTOL fixed-wing aircraft having step-up overlapping propellers at its rear end.

Referring now to FIG. 6, one exemplary embodiment is shown where the axes A1, A2 of the two staggered lifting propellers 133, 134 are aligned along the longitudinal axis of the linear support 130.

It should be understood that the above-described angles and coverage ratios are exemplary and any other angles/coverage rates can be adopted in various embodiments of this disclosure.

In the embodiments shown in FIGS. 1-22, the VTOL fixed-wing aircraft 100, 200, 300 has no control surfaces. In other words, its tail vertical stabilizers 140, 240, 340 have no rudder and its main wings 124, 224, 324 have no aileron and no flaps. Other embodiments can contemplate having at least one of aileron, flap, and rudder.

In the embodiments shown in FIGS. 10-22, there can be a pod 260, 360 detachably attached under the body 210, 310 of the VTOL aircraft 200, 300, respectively. In other embodiment, these pods 260, 360 can be fixedly attached to the body 210, 310 and cannot be readily decoupled from the body 210, 310, respectively.

The pod can be a passenger pod 260 or a cargo pod 360. With the pod 260, 360 decoupled from the body 210, 310, the VTOL aircraft can be called a flying platform. The flying platform can fly without carrying a pod 260, 360 and it can interchangeably carry different pods 260, 360.

In the examples shown, all of the pods 260, 360 are respectively carried underneath the body 210, 310. A pod 260, 360 can be first loaded with passengers and/or cargo on the ground and prior to or after the body 210, 310 is attached to the pod 260, 360.

The respective engagement and disengagement between the body 210, 310 and the pods 260, 360 can be performed autonomously (without simultaneous user intervention) by a computer and/or other sensors and computing devices. Alternatively or optionally, a human user can actively control and direct the engagement and disengagement between the VTOL aircraft 200, 300 and the respective pods 260, 360. This human user can be at a remote location, on the ground, or located within the passenger pod 260.

As those of ordinary skill in the art will recognize, various different types of engaging mechanism can be used to secure the pods 260, 360, to the respective body 210, 310. For example, the engaging mechanism can be mechanical catches, magnetic catches, tracks and grooves, or a combination of any known engagement coupler.

Figure 10:
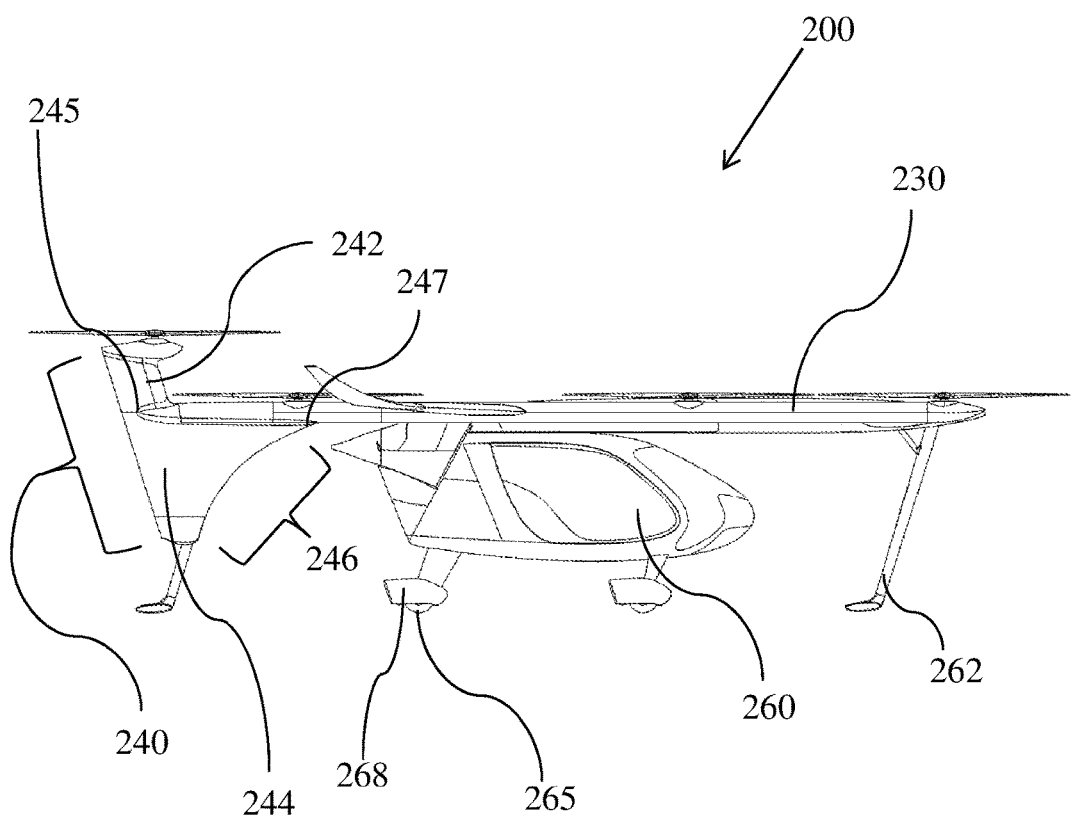
FIG. 10 is a side view of another embodiment of the VTOL fixed-wing aircraft having a passenger pod.
Figure 11:
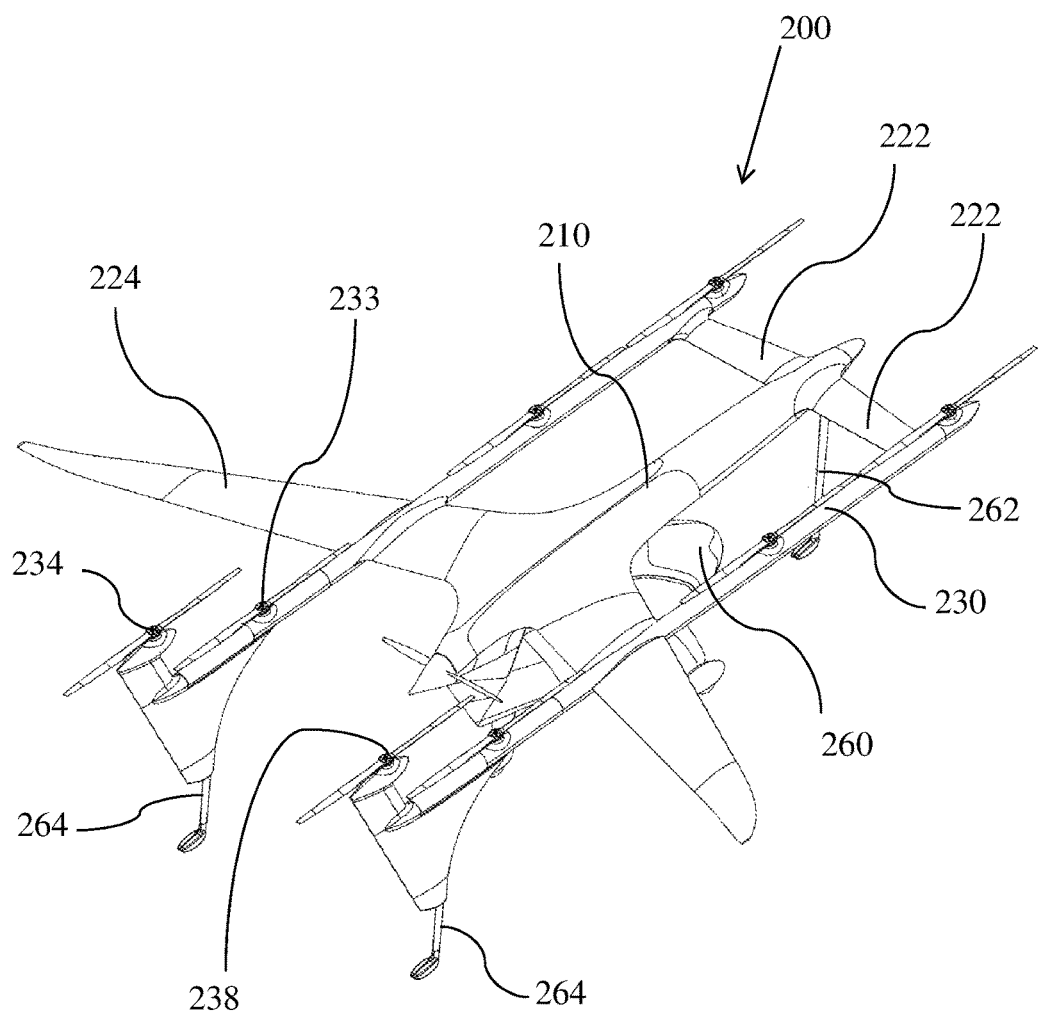
FIG. 11 is a top side perspective view of the VTOL fixed-wing aircraft of FIG. 10.
Figure 12:
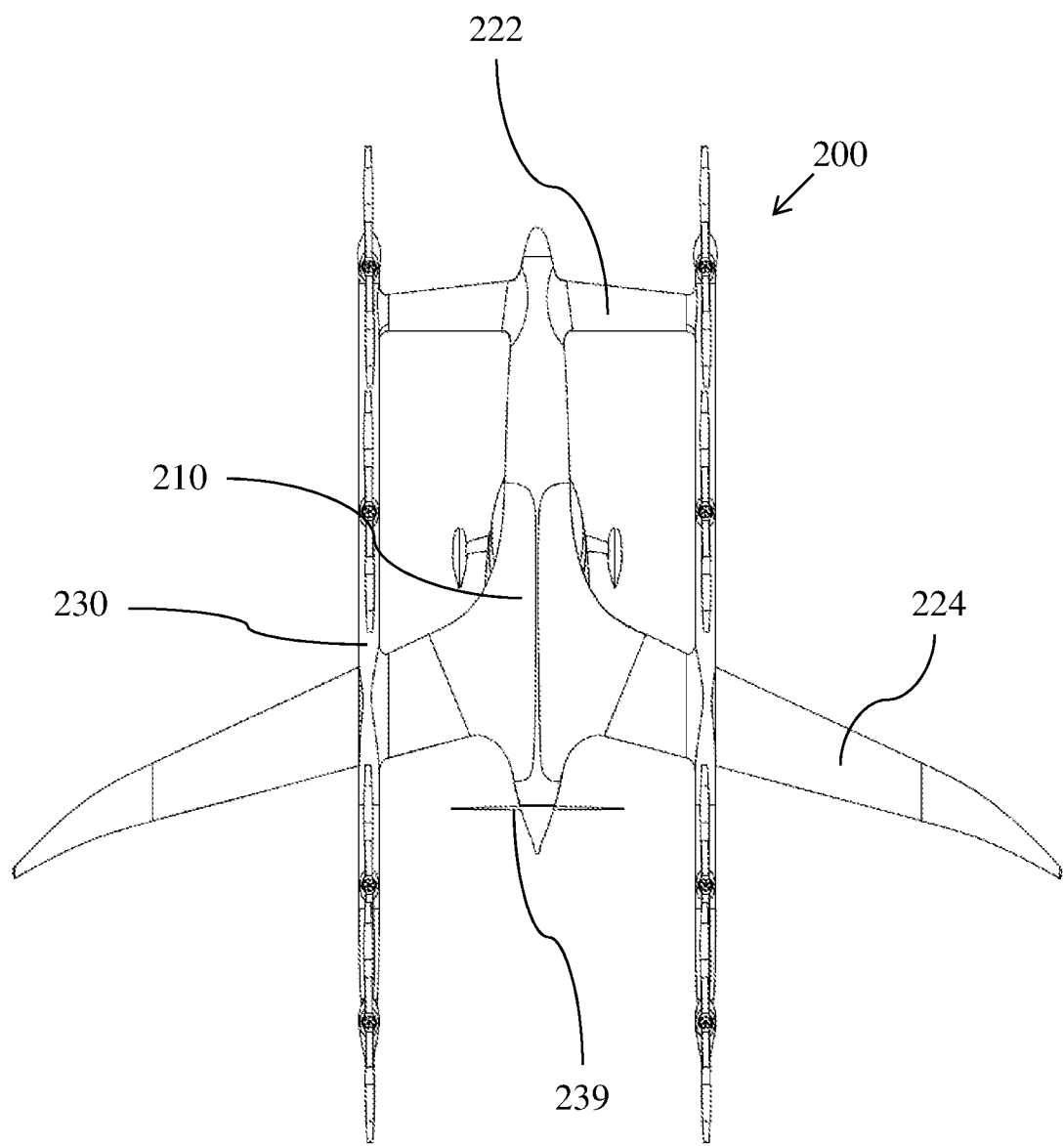
FIG. 12 is a top view of the VTOL fixed-wing aircraft of FIG. 10.
Figure 13:
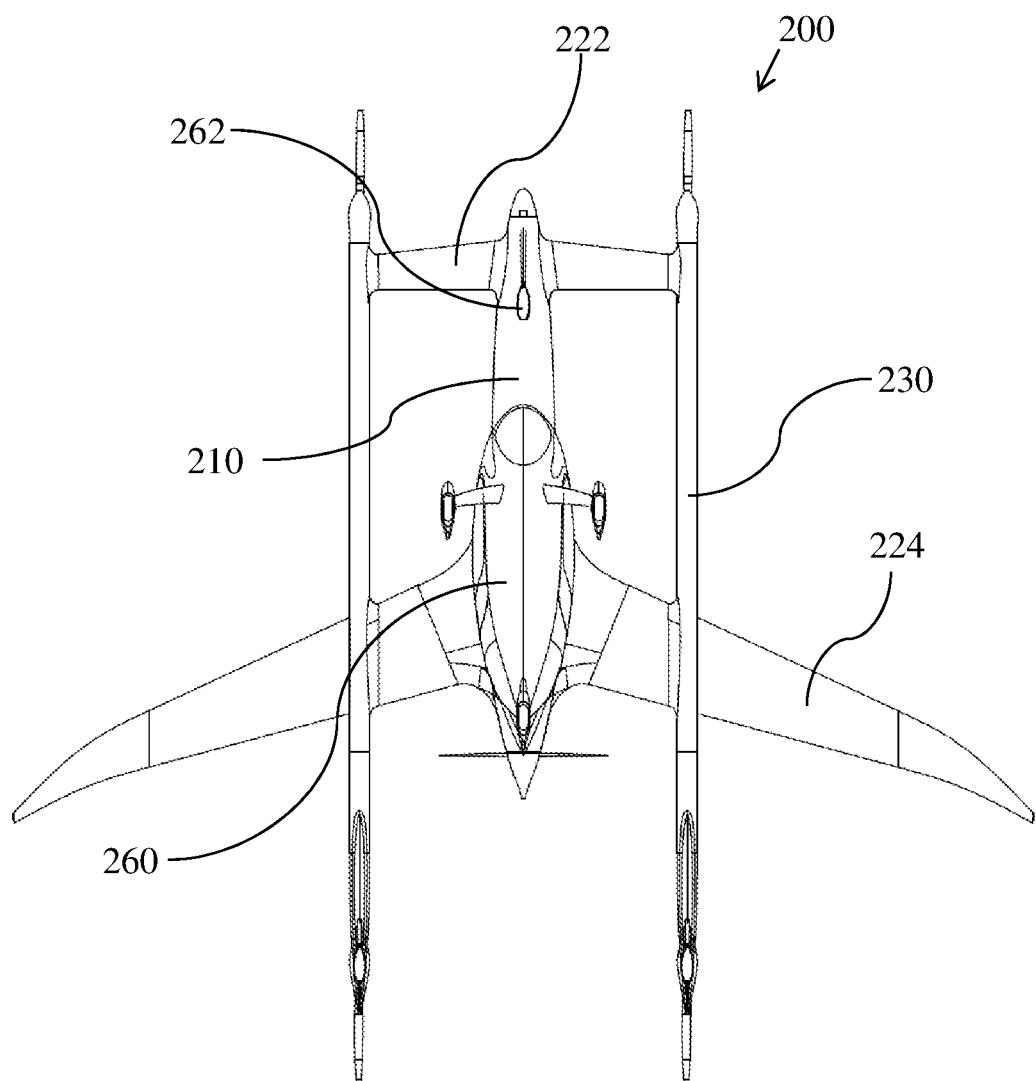
FIG. 13 is a bottom view of the VTOL fixed-wing aircraft of FIG. 10.
Figure 14:
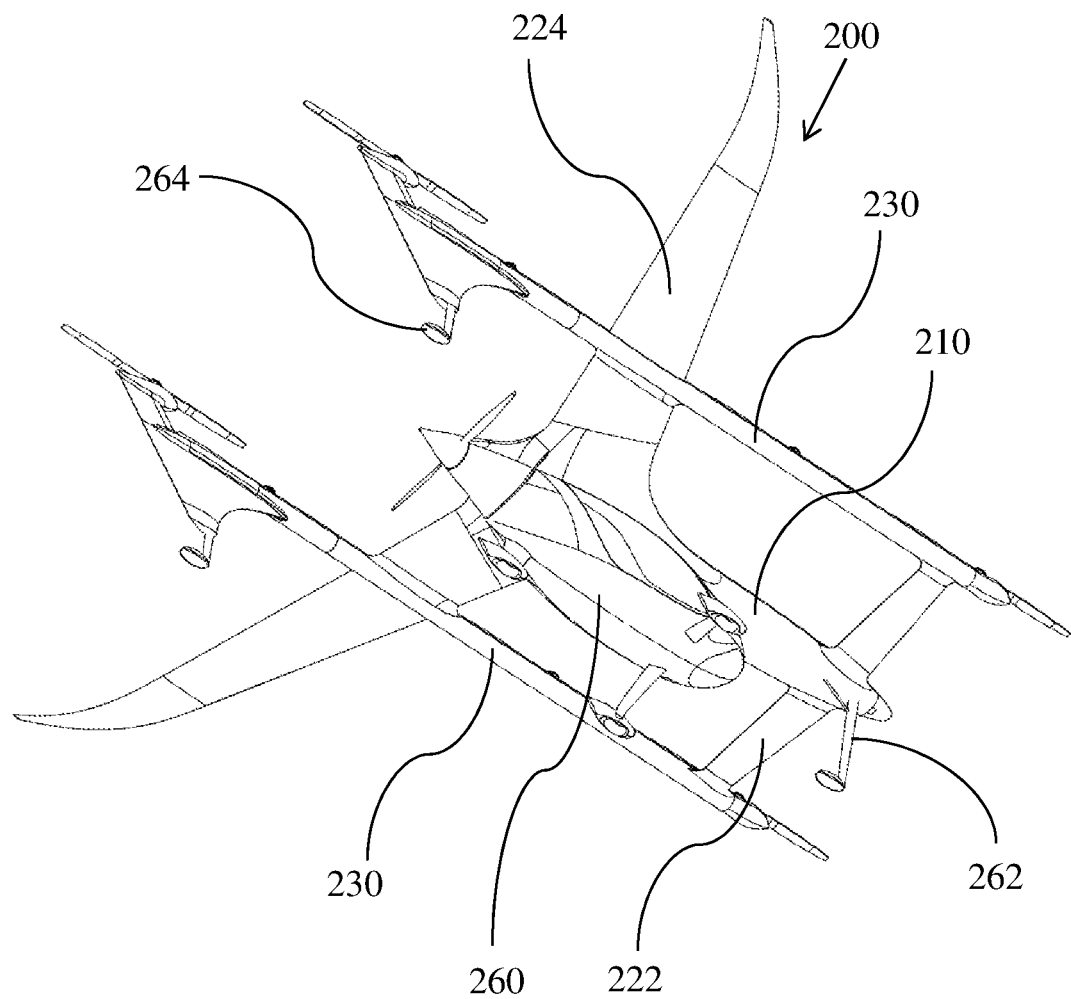
FIG. 14 is a bottom perspective view of the VTOL fixed-wing aircraft of FIG. 10.
Figure 15A:
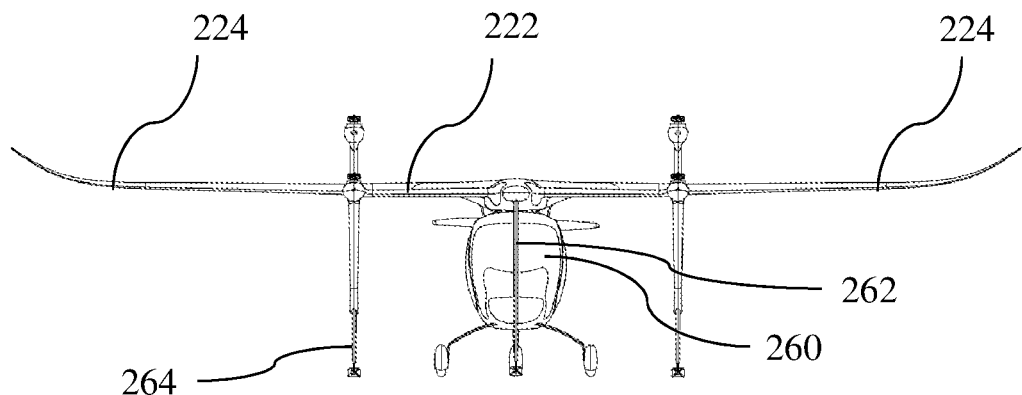
FIG. 15A is a front view of the VTOL fixed-wing aircraft of FIG. 10.
Figure 15B:
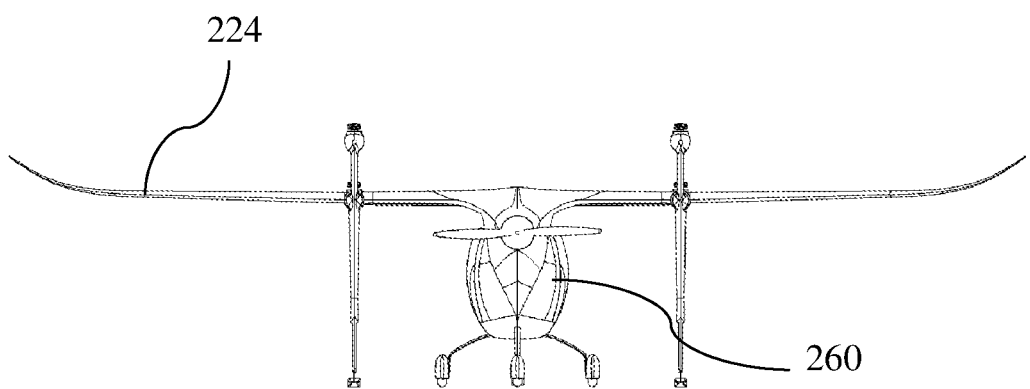
FIG. 15B is a rear view of the VTOL fixed-wing aircraft of FIG. 10.
Figure 16:
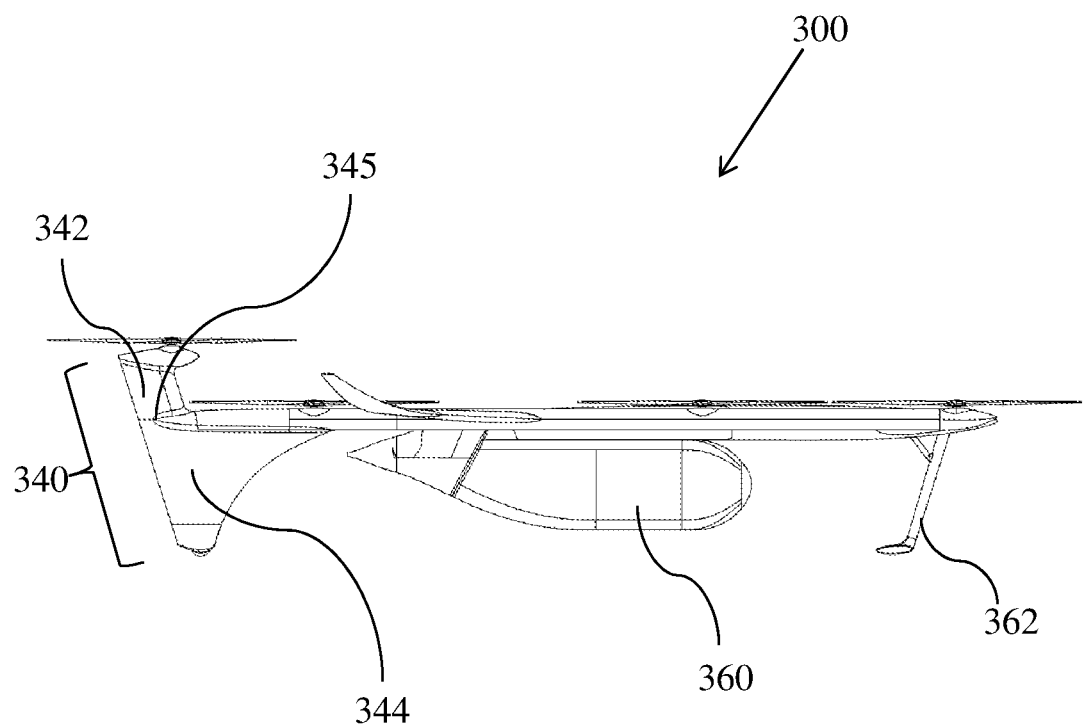
FIG. 16 is a side view of another embodiment of the VTOL fixed-wing aircraft with step-up overlapping propellers utilizing an interchangeable cargo pod.
Figure 17:
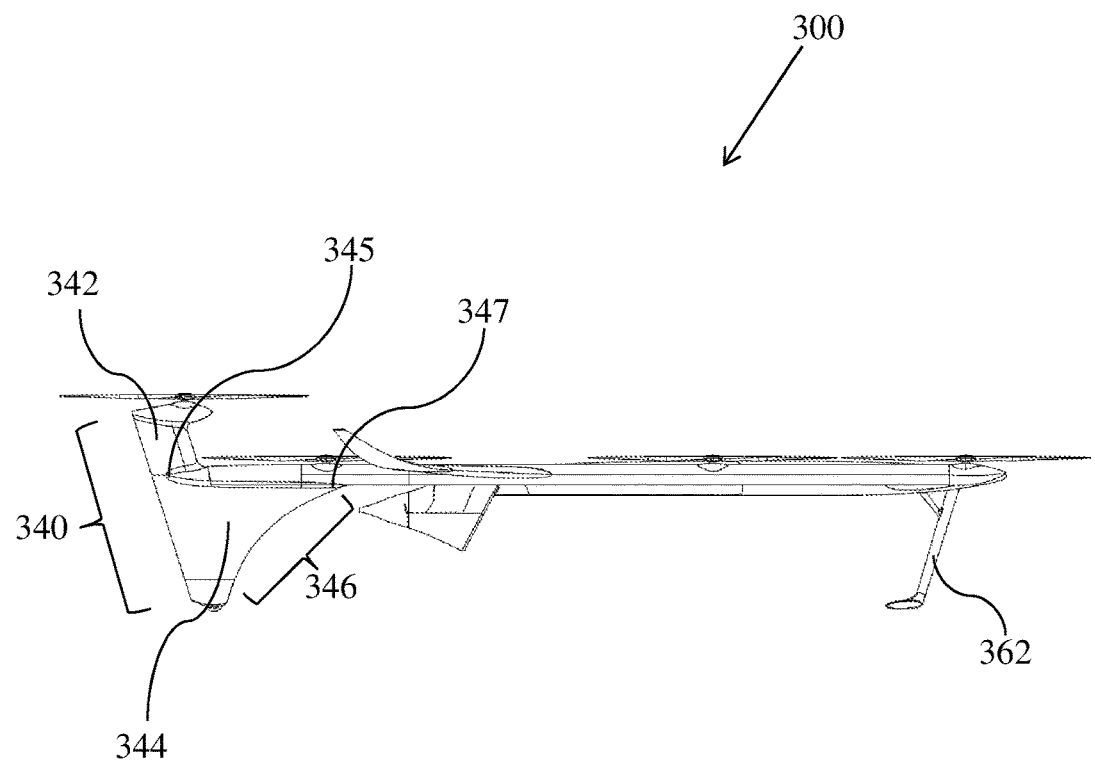
FIG. 17 is a side view of the VTOL fixed-wing aircraft of FIG. 16 with the cargo pod removed.
Figure 18:
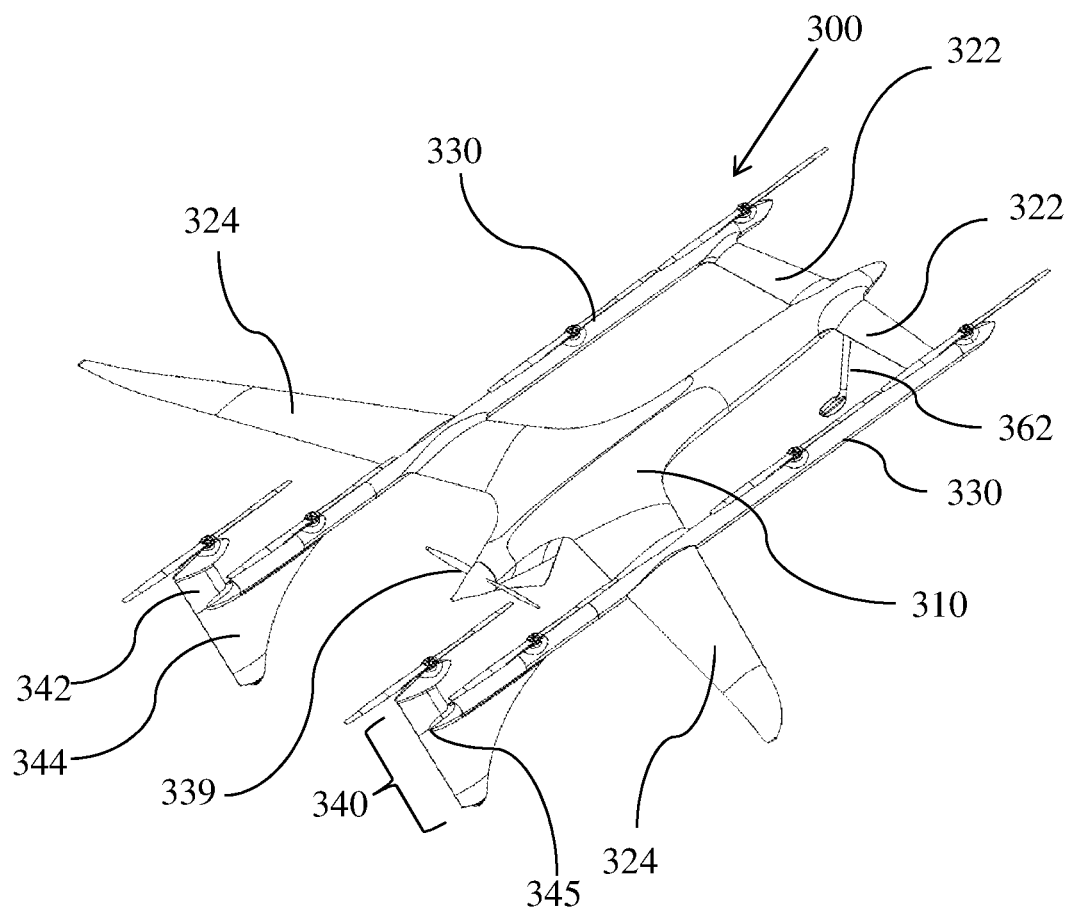
FIG. 18 is a top perspective view of the VTOL fixed-wing aircraft of FIG. 16 with the cargo pod removed.
Figure 19:
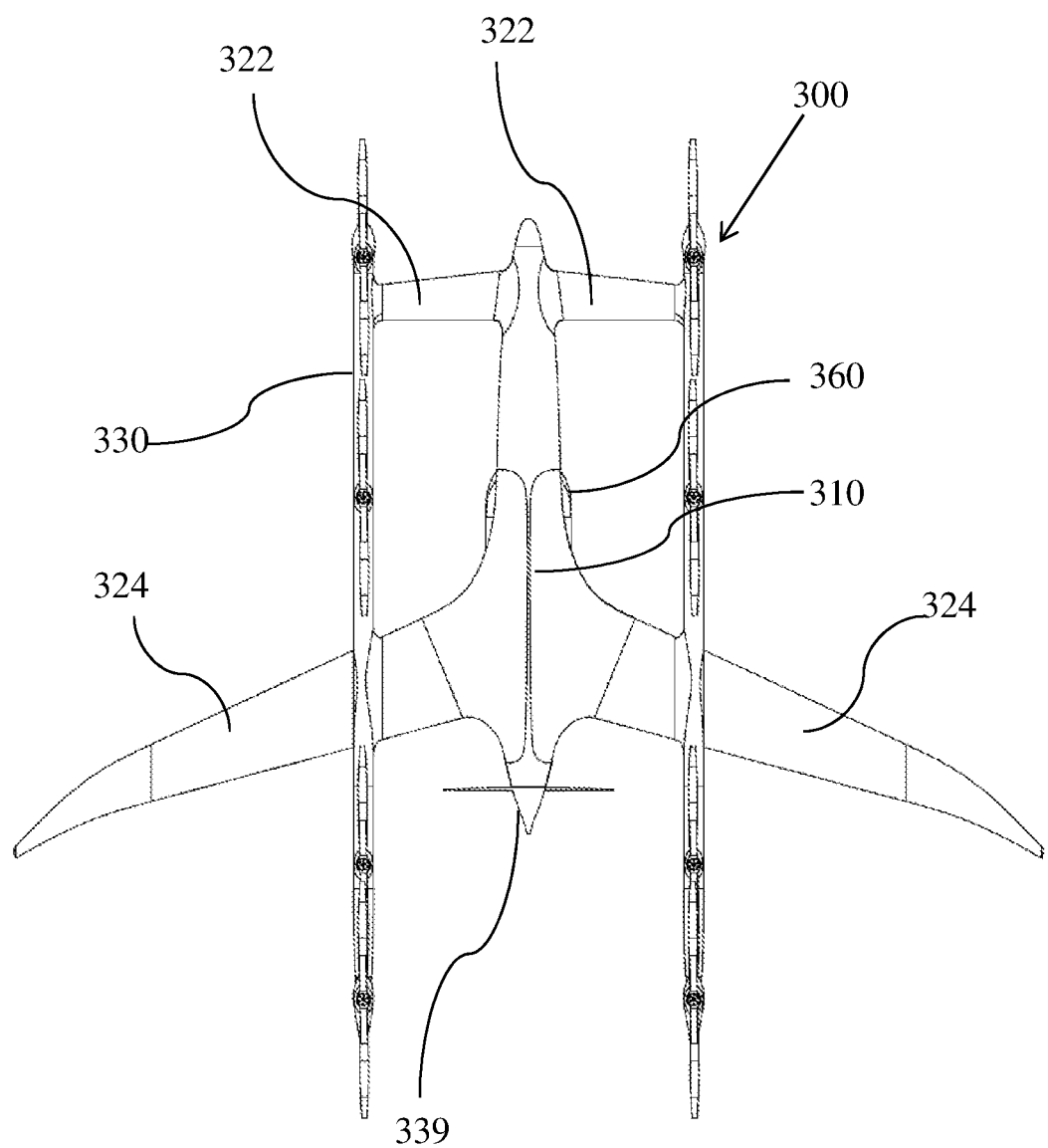
FIG. 19 is a top view of the VTOL fixed-wing aircraft of FIG. 16 with a cargo pod engaged.
Figure 20:
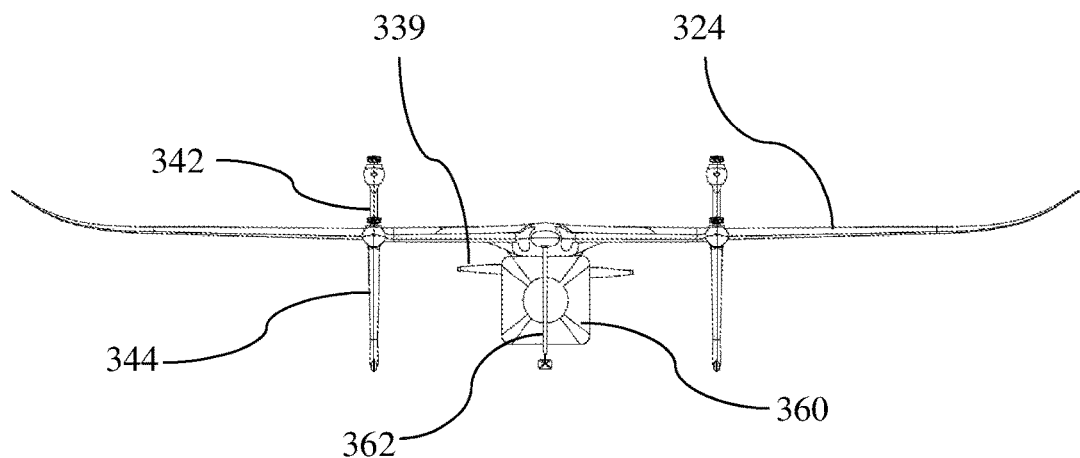
FIG. 20 is a front view of the VTOL fixed-wing aircraft of FIG. 16 with a cargo pod engaged.
Figure 21:
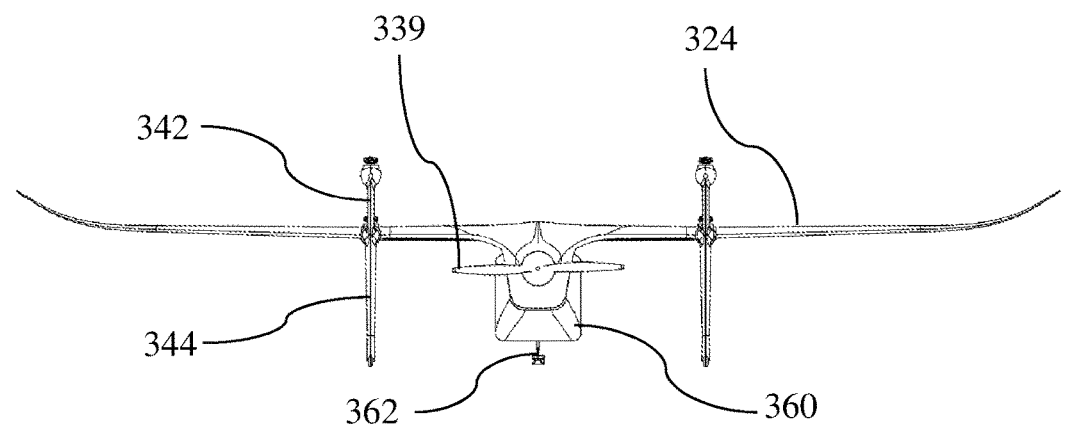
FIG. 21 is a rear view of the VTOL fixed-wing aircraft of FIG. 16 with a cargo pod engaged.
Figure 22:
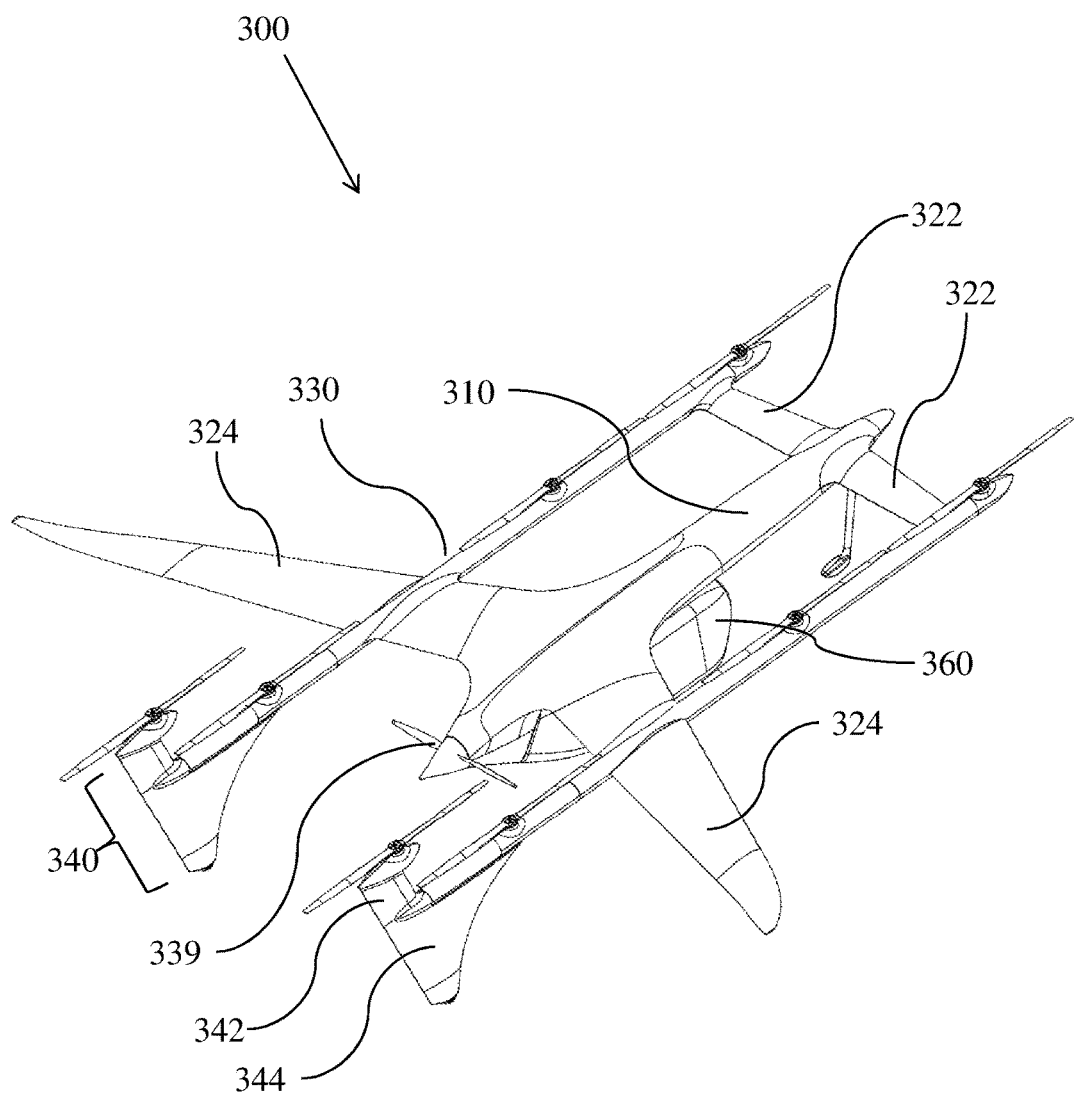
FIG. 22 is a top perspective view of the VTOL fixed-wing aircraft of FIG. 16 with a cargo pod engaged.

FIG. 10 illustrates an embodiment where the pod 260 may have motorized wheels 265 attached thereon. A single unit of motorized wheel 265 can be individually driven by a designated motor enclosed in a motor housing 268.

The contemplated motorized wheel 265 can move the pod 260 across the ground. This allows a pod 260 to wheel away from or towards a VTOL aircraft 200.

In some embodiments of the disclosed pods 260, 360 there can be provided at least one floatation device (not shown). The contemplated floatation device can be a type that requires actuation, that is, active inflation with gas or other material when needed. In other words, in this particular embodiment, the floatation device can remain in a deflated state and is inflated only when certain conditions trigger the inflation. For example, the floatation device can be automatically inflated during water landing.

Many known types of inflation mechanism or air bag mechanism may be implemented to achieve the needs of the disclosed floatation device. The contemplated floatation device may be a type that can be reused, re-inflated, re-deflated, over and over. The contemplated floatation device can also be of one-time use only.

Whether it is a passenger pod 260, cargo pod 360, or any other types of load, it is especially contemplated that there can be an energy storage unit disposed within the body 110, 210, 310 of the respective VTOL aircraft 100, 200, 300. The energy stored can be used to power components of the VTOL aircraft 100, 200, 300 such as the lifting propellers and pushing propellers. The energy stored can be electricity and the storage unit can be a battery. In another embodiment, this energy storage unit can be used to power accessories within the pod 260, 360. In other specifically contemplated embodiments, the energy can be any known type of energy source and in any state, for example, in liquid, gaseous, or gel. It should be particularly noted that in some embodiments, at least one motor in the VTOL aircraft 100, 200, 300 may a hybrid motor, an all-electric motor, or a non-electric motor.

Contemplated energy storage unit can also be disposed in other parts of the VTOL aircraft 100, 200, 300 such as within the linear supports 130, 230, 330.

Alternatively or optionally, there can be an energy storage unit disposed within the pod 260, 260. In such embodiments, the energy stored in these storage units can be used to power the lifting propellers and pushing propeller when the pod 260, 260 is attached to the respective body 210, 310. By having an energy storage unit in the pod 260, 360, the respective VTOL aircraft 200, 300 would effectively replenish its energy source every time the VTOL aircraft 200, 300 is attached to a new pod 260, 360. In this way, when the VTOL aircraft 200, 300 swaps an old pod 260, 360 for a new pod 260, 360, the VTOL aircraft 200, 300 is fully charged.

In one embodiment, the main source of electricity for the VTOL aircraft 200, 300 comes from energy storage unit located in the respective pod 260, 360.

Thus, specific embodiments and applications of VTOL fixed-wing aircraft have been disclosed. It should be apparent, however, to those skilled in the art that many more modifications besides those already described are possible without departing from the disclosed concepts herein. The disclosed embodiments, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the embodiments. In addition, where the specification and claims refer to at least one of something selected from the group consisting of A, B, C . . . and N, the text should be interpreted as requiring at least one element from the group which includes N, not A plus N, or B plus N, etc.

The definitions of the words or elements of the following claims include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim.

Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

What is claimed is:

1. A VTOL (vertical take-off and landing) aircraft comprising:
   a body;
   a left main wing and a right main wing coupled to the body;
   a left secondary wing and a right secondary wing coupled to the body;
   a left linear support connecting the left main wing to the left secondary wing;
   a right linear support connecting the right main wing to the right secondary wing, wherein the left linear support is parallel to the right linear support;
   at least two lifting propellers disposed on a top surface of each of the left and right linear supports, wherein the at least two lifting propellers on each of the left and right linear supports are all horizontally positioned on a first horizontal plane;

a left tail-top propeller disposed at a rear end of the VTOL aircraft, vertically positioned higher than the first horizontal plane;

a right tail-top propeller disposed at the rear end of the VTOL aircraft, vertically positioned higher than the first horizontal plane; and wherein a radius of the left and right tail-top propellers is the same as a radius of each of the at least two lifting propellers.

2. The VTOL aircraft as recited in claim 1, wherein from a direct top view, a range of rotary motion of the left tail-top propeller partially and visually overlaps with a range of rotary motion of a rearmost propeller out of the at least two lifting propellers disposed on the left linear support.

3. The VTOL aircraft as recited in claim 2, wherein the left and right secondary wings are forewings disposed in front of the left and right main wings, and the aircraft has a canard body style.

4. The VTOL aircraft as recited in claim 2 further comprising a pod detachably attached to the body, wherein the pod is a passenger pod or a cargo pod.

5. The VTOL aircraft as recited in claim 4 further comprising motorized wheels disposed on the pod allowing said pod to move across a surface.

6. The VTOL aircraft as recited in claim 2, wherein each of the left and right linear support extends rearward beyond the left and right main wings, wherein the left and right main wings are a pair of rearmost wings.

7. The VTOL aircraft as recited in claim 2 further comprising a left vertical stabilizer disposed on a rear end of the left linear support, wherein the left tail-top propeller is disposed on a top end of the left vertical stabilizer.

8. The VTOL aircraft as recited in claim 7, wherein the left vertical stabilizer has a bottom portion that extends downwardly beyond the first horizontal plane.

9. The VTOL aircraft as recited in claim 8 further comprising a landing gear disposed on a bottom end of the bottom portion.

10. The VTOL aircraft as recited in claim 8, wherein the left vertical stabilizer has a front leading edge that spans in a forward direction beyond an axis of the rearmost propeller out of the at least two lifting propellers disposed on the left linear support.

11. A VTOL (vertical take-off and landing) aircraft comprising:
a body;
a left main wing and a right main wing coupled to the body;
a left secondary wing and a right secondary wing coupled to the body;
a left linear support connecting the left main wing to the left secondary wing;
a right linear support connecting the right main wing to the right secondary wing, wherein the left linear support is parallel to the right linear support;
at least two lifting propellers disposed on each of the left and right linear supports;
a left vertical stabilizer disposed on a rear end of the left linear support, wherein the left vertical stabilizer has a bottom portion that extends downwardly and is lower than a lowest point of the body; and
a landing gear disposed on a bottom end of the bottom portion.

12. The VTOL aircraft as recited in claim 11 further comprising a left tail-top propeller coupled to the left linear support and being positioned vertically higher than the at least two lifting propellers.

13. The VTOL aircraft as recited in claim 12, wherein a radius of the left tail-top propeller is the same as a radius of each of the at least two lifting propellers.

14. The VTOL aircraft as recited in claim 13, wherein the rearmost lifting propeller of the at least two lifting propellers on the left linear support has a first rotary range of motion and the left tail-top propeller has second rotary range of motion, the first rotary range of motion being offset vertically from the second rotary range of motion, and from a top view the first rotary range of motion partially overlaps with the second rotary range of motion.

15. The VTOL aircraft as recited in claim 14 further comprising a detachable pod coupled to the body, wherein the pod is a passenger pod or a cargo pod.

16. The VTOL aircraft as recited in claim 15 further comprising motorized wheels coupled to the pod allowing the pod to move across a surface.

17. The VTOL aircraft as recited in claim 15 further comprising a push propeller coupled to the pod.

18. The VTOL aircraft as recited in claim 12, wherein the left vertical stabilizer has a top portion that extends upwardly beyond a horizontal position of the left linear support, and said left tail-top propeller is disposed on a top end of the top portion.

19. The VTOL aircraft as recited in claim 11 further comprising a retractable front landing gear disposed on a bottom front end of the body, the retractable landing gear has an elongated body and a skid.

20. The VTOL aircraft as recited in claim 11, wherein the landing gear has an elongated body and a skid, and said landing gear can retrieve into the bottom portion.

* * * * *